May 8, 1962 P. W. PERISH 3,033,587
INDEPENDENT FRONT WHEEL SUSPENSION
Filed May 4, 1959 2 Sheets-Sheet 1
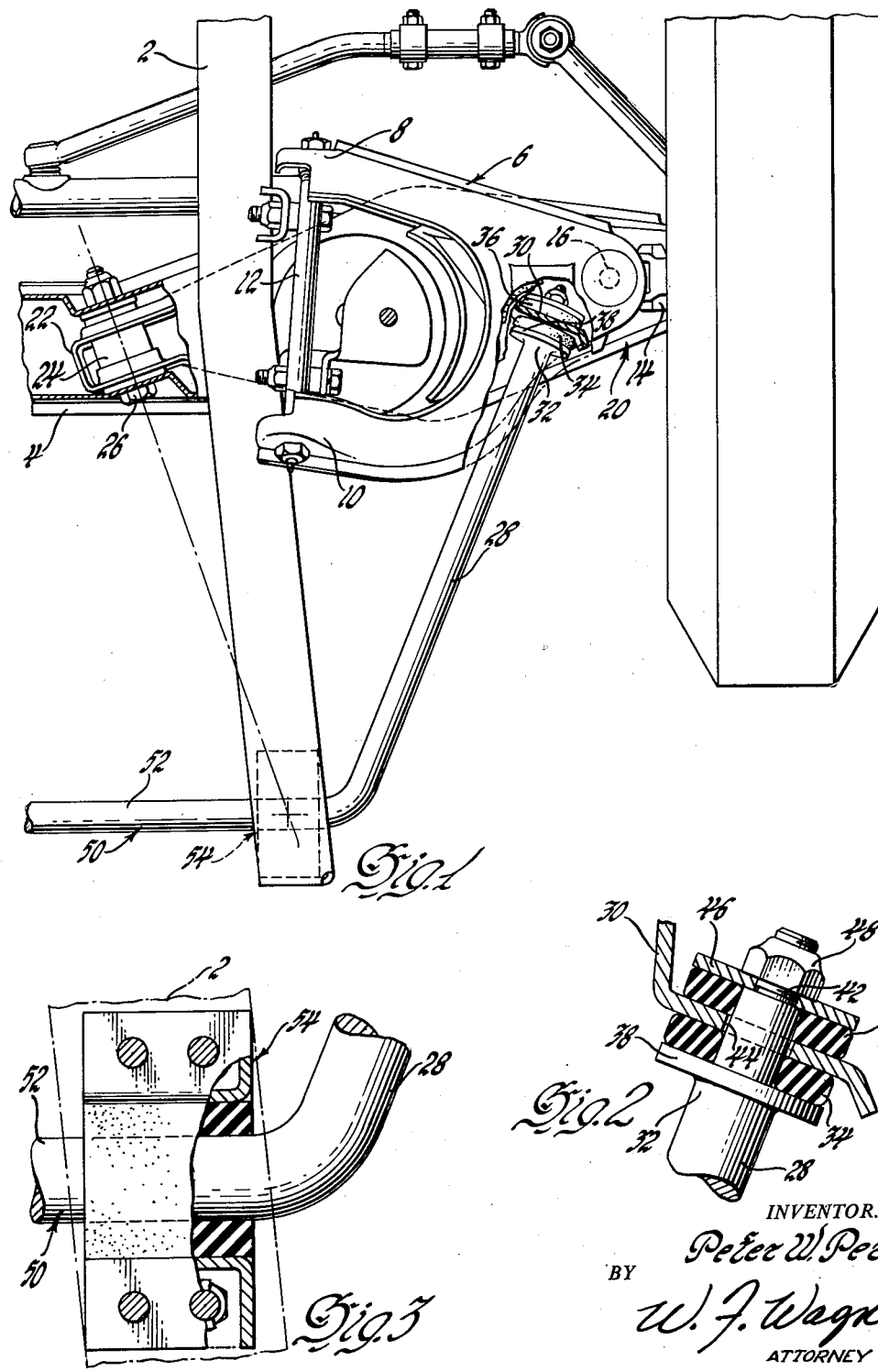
INVENTOR.
Peter W. Perish
BY
W. J. Wagner
ATTORNEY May 8, 1962 P. W. PERISH 3,033,587
INDEPENDENT FRONT WHEEL SUSPENSION
Filed May 4, 1959 2 Sheets-Sheet 2
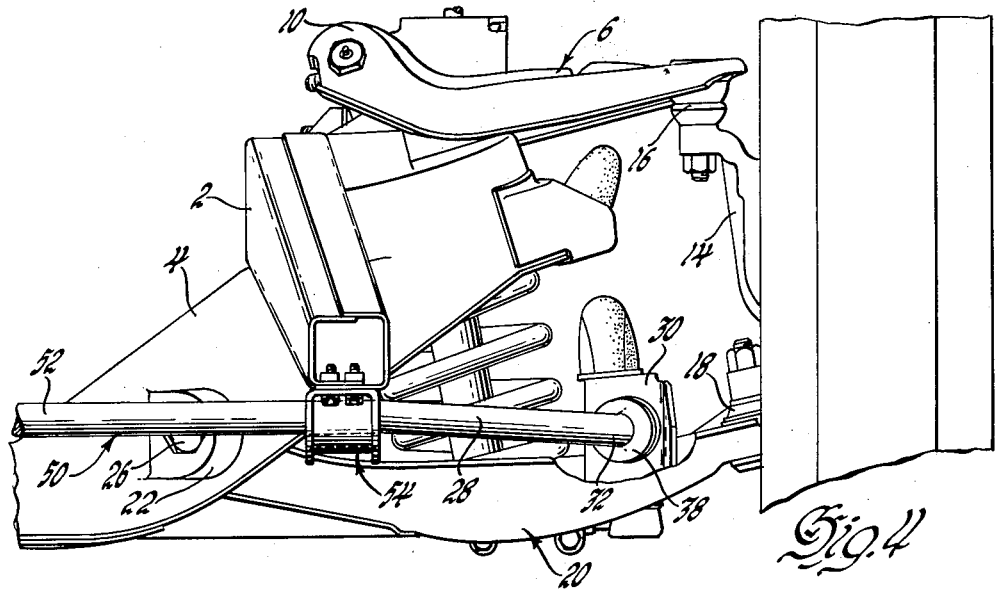
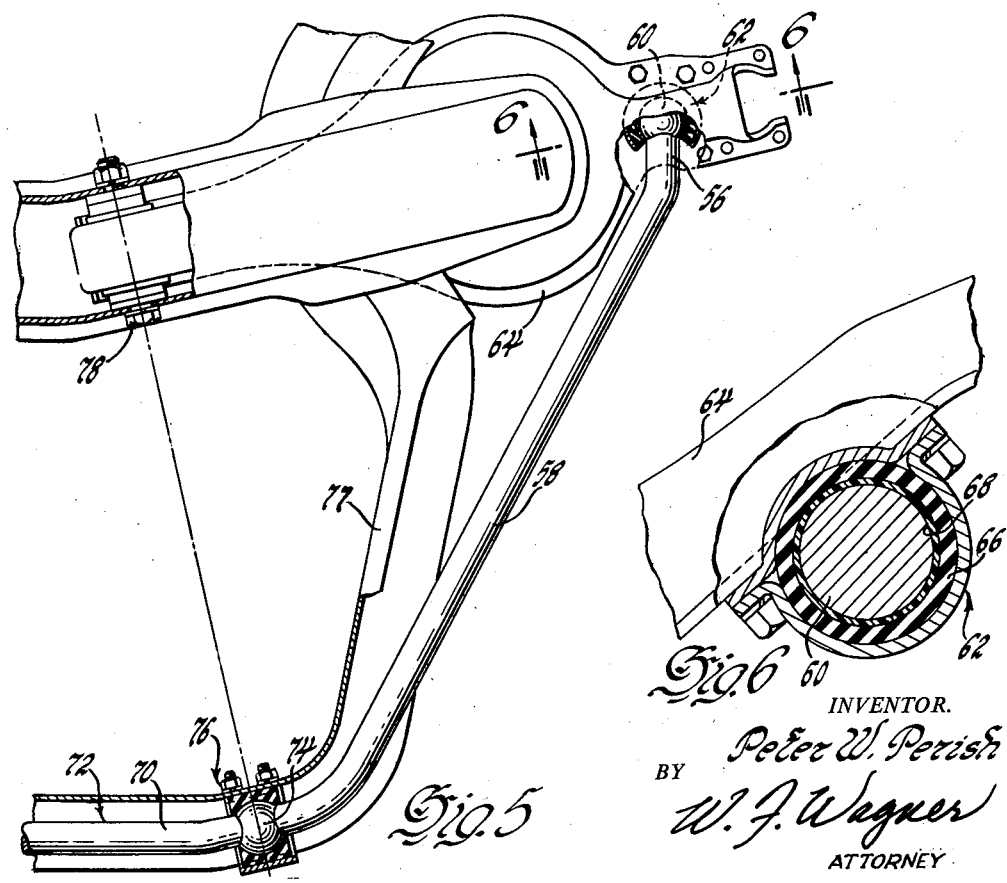
INVENTOR.
Peter W. Perish
BY
W. J. Wagner
ATTORNEY

United States Patent Office 3,033,587
Patented May 8, 1962

3,033,587
INDEPENDENT FRONT WHEEL SUSPENSION
Peter W. Perish, Flint, Mich., assignor to General Motors Corporation, Detroit, Mich., a corporation of Delaware
Filed May 4, 1959, Ser. No. 810,804
4 Claims. (Cl. 280—96.2)

This invention relates to vehicle suspension and more particularly to independent suspension for dirigible wheels.

In the past, the majority of passenger vehicles have utilized independent front wheel suspension wherein each dirigible wheel is connected to the sprung mass by means of a pair of vertically spaced generally parallel transversely extending control arms. During the period in which this type of wheel suspension has been in general use, control arms have generally been fashioned in the form of an A-frame or the so-called "wishbone" configuration in which the inboard ends are substantially spaced apart longitudinally. While this arrangement afforded certain benefits in terms of suspension stability by virtue of the relatively widely spaced inboard pivot connections, more recently it has become increasingly desirable to introduce a greater degree of flexibility in such suspension structures in order to reduce harshness resulting from longitudinal impact on the dirigible wheels. To accomplish this purpose, it has already been proposed to replace the conventional lower wishbone control arm with a composite structure comprising a single transverse lever arm and either a trailing or leading strut which extends obliquely between the outboard end of the lever arm and a suitable point on the vehicle frame. This arrangement, used in conjunction with suitable flexible mounting attachments, provides a limited degree of fore and aft flexibility of the outer end of the lower control arm which tends to cushion impact shock on the dirigible wheel.

In making the transition just described it remained desirable to continue utilization of the familiar torsional roll stabilizer which functions to resist undue body roll while the vehicle is negotiating turns. Conventionally, such stabilizers take the form of a one-piece spring having a transverse central portion journalled at opposite sides of the frame and a pair of integral trailing arm portions which are connected by suitable linkage to the lower control arms of the respective dirigible wheels. During parallel ride deflection, this roll stabilizer operates essentially without influencing the primary spring characteristics of the suspension, owing to the fact that both of the trailing arms deflect in the same direction and the same amount. However, under conditions of roll deflection, one arm is caused to deflect downwardly while the other arm is urged upwardly. The torsional deflection of the central portion thus induced reacts through the frame to resist the roll tendency of the sprung mass. Since this type of stabilizer performs equally well without regard to the nature of the basic suspension components, it was incorporated without significant modification in the controlled flexibility type of suspension construction just described.

An object of the present invention is to provide an improved and simplified independent dirigible wheel suspension having controlled flexibility characteristics.

Another object is to provide independent wheel suspension incorporating a torsional roll stabilizer which is arranged with reference to the suspension structure so as to allow complete elimination of certain structural elements thereof previously required.

Still another object is to provide an independent wheel suspension incorporating torsional roll stabilizing means wherein the latter is constructed and arranged with reference to the associated suspension components so that the former is operative to determine and control wheel alignment under all operating conditions as well as to resist vehicle body roll when the vehicle is negotiating a curve.

A further object is to provide independent wheel suspension including vertically spaced transversely extending wheel control arms and a torsional roll stabilizer, one of said control arms being connected to the vehicle sprung mass by means of a single flexible pivotal connection, the roll stabilizer being connected to the frame and the last mentioned control arm, respectively, in such a way that longitudinal impact on the vehicle wheel is resisted primarily by the roll stabilizer.

Still a further object is to provide an arrangement of the stated character wherein the roll stabilizer is spaced forwardly of the single pivot control arm and is formed with an obliquely disposed trailing leg portion flexibly connected to the arm near the outboard end thereof so as to provide a tension strut effective to restrain horizontal swinging movement of the arm within predetermined limits.

A still further object is to provide an arrangement of the type described wherein the transversely extending midportion of the roll stabilizer is journalled in flexible mounts at opposite sides of the vehicle, each of which flexible mounts are located substantially in alignment with the projected axis of the single pivotal connection of the control arm adjacent thereto.

Yet another object is to provide an arrangement of the stated character wherein the trailing leg portion of the stabilizer is connected to the control arm in a manner providing limited universal movement therebetween, the connection being so formed as to resist torsional windup of the arm.

These and other objects, advantages, and features of the invention will become more fully apparent as reference is had to the accompanying specification and drawings wherein:

FIG. 1 is a partial plan view of a vehicle chassis illustrating front wheel suspension according to the invention;

FIG. 2 is an enlarged fragmentary view, partly in section, illustrating a detail of construction of the invention shown in FIG. 1;

FIG. 3 is an enlarged fragmentary view, partly in section and with parts broken away, illustrating an additional detail of construction of the invention;

FIG. 4 is a front elevational view of the arrangement shown in FIG. 1;

FIG. 5 is a partial top plan view of a modified form of the invention; and

FIG. 6 is an enlarged fragmentary view, partly in section, looking in the direction of arrows 6—6 of FIG. 5.

Referring now to the drawings and particularly FIGS. 1 and 4, there is illustrated a dirigible wheel suspension arrangement wherein the reference numeral 2 designates one of the vehicle frame side rails. Extending transversely between side rail 2 and the opposite side rail, not shown, is a front cross frame member 4. Extending transversely outwardly from side rail 2 is a swingable upper wishbone type wheel control arm 6 which has its spaced apart inboard ends 8 and 10 pivotally connected to rail 2 by means of a longitudinally extending vertically inclined pivot shaft assembly 12. At its outer end, upper control arm 6 is connected to a vertically extending wheel knuckle 14 by means of a ball joint assembly 16. At its lower end, wheel knuckle 14 is pivotally secured by means of a ball joint assembly 18 to the outboard end of a beam type lower wheel control arm 20. As seen best in FIG. 1, the inboard end 22 of lower control arm 20 is relatively narrow in longitudinal dimension and includes a sleeve portion 24 which surrounds horizontally directed rubber bushed pivot shaft 26 connected to cross frame member 4 inboard of side rail 2.

It will be apparent that in view of the very limited length of pivot 26, very little resistance to longitudinal deflection of arm 20 is afforded. Accordingly, there is provided an obliquely arranged strut portion 28 which extends between frame side rail 2 and a bracket 30 formed near the outboard end of control arm 20. In addition to other functions shortly to be described, strut portion 28 operates to establish the horizontal angular position of lower control arm 20. However, in order to permit the desired limited degree of flexibility with respect to horizontal angular movement of the arm, the end 32 of strut portion 28 is connected to bracket 30 by means of opposed compression type rubber biscuits 34 and 36. As seen best in FIG. 2, end 32 is provided with a flanged portion 38 which forms a seat for compression biscuit 34. Biscuit 34, in turn, engages the forward face of bracket 30. Threaded terminal portion 42 of end 32 extends through biscuit 34 and an aperture 44 in bracket 30 and emerges through biscuit 36 at the opposite side of bracket 30. The entire assembly is then adjusted to and maintained at the desired compression by means of a washer 46 and nut 48.

In accordance with the principal feature of the invention, strut portion 28 forms an integral part of a one-piece torsional roll stabilizer 50, the central transverse portion 52 of which is journalled in flexible bushing assemblies 54 which are mounted respectively on side rail 2 and the opposite side rail, not shown. When arranged in the manner shown, roll stabilizer 50 not only performs its normal function of resisting body roll by torsional windup of the central portion 52, but also serves to provide the requisite geometric stability for lower control arm 20. As a result, it is possible to dispense entirely with the separate oblique strut present in prior art structures. Needless to say, the resulting structure is significantly more economical in terms of material, fabrication, and assembly. In addition, substantial advantage in weight saving and reduction in complexity of structure is accomplished.

In order that the dual function of assembly 50 may be accomplished with little or no conflict between the separate functions required therefrom, according to another feature of the invention flexible bushing assemblies 54 supporting the transverse central portion 52 are located on the vehicle frame so that their effective centers are colinear with the projected axis of each associated inboard pivot shaft 26. As will be evident from FIG. 1, upward deflection of the lower control arm 20 about pivot 26 will result in upward movement of the end 32 of strut portion 28, in a conical path generated about the projected axis passing through pivot 26. The outboard end 32 will, therefore, remain a constant distance from the imaginary axis of shaft 26 regardless of the vertical deflection thereof. Accordingly, uniform deflection in the same direction of the lower control arm at each side of the vehicle will merely result in rotation of central portion 52 of stabilizer bar 50. Hence, the function of stabilizer 50 under such conditions is limited solely to maintaining the horizontal angular position of lower arm 20 by means of strut portions 28.

According to a further feature of the invention, compression biscuits 34 and 36 also work in conjunction with strut 28 and bracket 30 to impart increased stability to lower control arm 20 against forces such as braking which tend to tilt the arm as viewed in side elevation. As will be noted in FIG. 4, bracket 30 and biscuits 34 and 36 are arranged perpendicular to the horizontal plane of arm 20. Therefore, tilting of arm 20 is resisted by increased compression of the upper half of biscuit 34 and the lower half of biscuit 36.

In FIG. 5, there is shown a modification of the invention wherein the trailing end 56 of strut portion 58 is formed with a spherical head 60 which is received in a frusto-spherical retainer member 62 secured to the lower surface of the outboard end of control arm 64. Retainer 62 preferably includes a flexible liner portion 66 having an anti-friction inner surface 68 which tightly engages spherical head 60. Similarly, the transverse limits of torsionally active central portion 70 of stabilizer assembly 72 is upset to provide spherical portions 74 which are received in a flexible mount 76 secured to frame member 77 and a similar mount, not shown, at the opposite side of the vehicle. As mentioned previously in connection with the preferred embodiment, the geometric center of spherical portion 74 is located so as to be colinear with the projected axis of lower control arm inboard pivot 78.

While but two embodiments of the invention have been shown and described, it will be apparent that other changes and modifications may be made therein. It is, therefore, to be understood that it is not intended to limit the invention to the embodiments shown, but only by the scope of the claims which follow.

I claim:
1. In a motor vehicle having a frame, independent wheel suspension at each side thereof comprising, an upper control arm having substantially longitudinally spaced apart inboard pivotal connections with said frame defining an inclined axis, a beam type lower arm having a single horizontal inboard flexible pivotal connection with said frame, a wheel knuckle extending between and pivotally connected to the outboard ends of said arms, a transversely disposed torsional roll stabilizer supported in resilient bearings located at laterally spaced points on said frame forwardly of said control arms and colinear with the projected axis of the inboard pivotal connection of the lower control arm at the adjacent side of the vehicle, said stabilizer including a central transverse torsionally active portion and integral obliquely directed trailing arm portions connected to said lower control arms near the outboard ends thereof, said trailing arms forming the sole means for restraining substantial horizontal deflection of said lower control arms.

2. The structure set forth in claim 1 wherein the connection between the trailing arm portion and lower control arm is a resilient connection adapted to yieldingly resist both horizontal and torsional deflection of the control arm connected thereto.

3. The structure set forth in claim 2 wherein the resilient connection comprises a spherical end on the trailing arm portion disposed in a frusto-spherical socket member attached to the lower arm, and a resilient liner between the spherical end and socket including an inner layer of low friction material.

4. In a motor vehicle having a frame, independent wheel suspension at each side thereof comprising, an upper control arm having substantially longitudinally spaced apart inboard pivotal connections with said frame defining an inclined axis, a beam type lower arm having a single horizontal inboard flexible pivotal connection with said frame, a wheel knuckle extending between and pivotally connected to the outboard ends of said arms, a transversely disposed torsional roll stabilizer supported in resilient bearings located at laterally spaced points on said frame forwardly of said control arms and colinear with the projected axis of the inboard pivotal connection of the lower control arm at the adjacent side of the vehicle, said stabilizer including a central transverse torsionally active portion and integral obliquely directed trailing arm portions extending through vertically disposed apertured brackets on said lower control arms near the outboard ends thereof, resilient annular members surrounding said ends in opposed compressively loaded relation with said bracket, said trailing arms and connections forming the sole means for restraining substantial horizontal deflection of said lower control arms.

References Cited in the file of this patent

UNITED STATES PATENTS

| | | |
|---|---|---|
| 2,190,298 | Slack | Feb. 13, 1940 |
| 2,361,025 | Graham et al. | Oct. 24, 1944 |
| 2,517,611 | Utz | Aug. 8, 1950 |
| 2,596,922 | Thoms | May 13, 1952 |
| 2,626,797 | Cuskie | Jan. 27, 1953 |
| 2,770,453 | Cuskie | Nov. 13, 1956 |
| 2,792,215 | Timpner et al. | May 14, 1957 |